May 14, 1929.　　　W. P. COUSINO　　　1,713,115
VALVE
Filed July 28, 1927
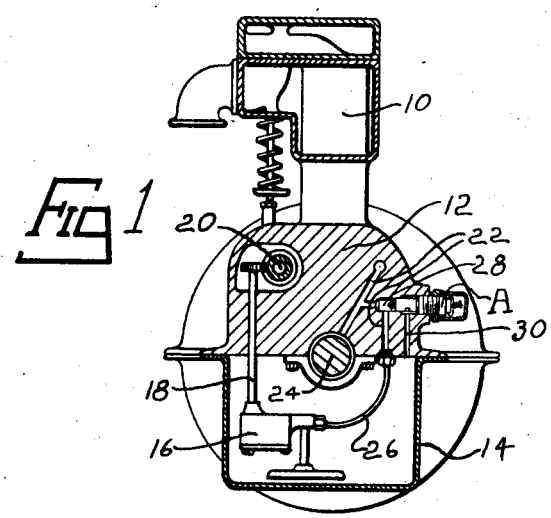
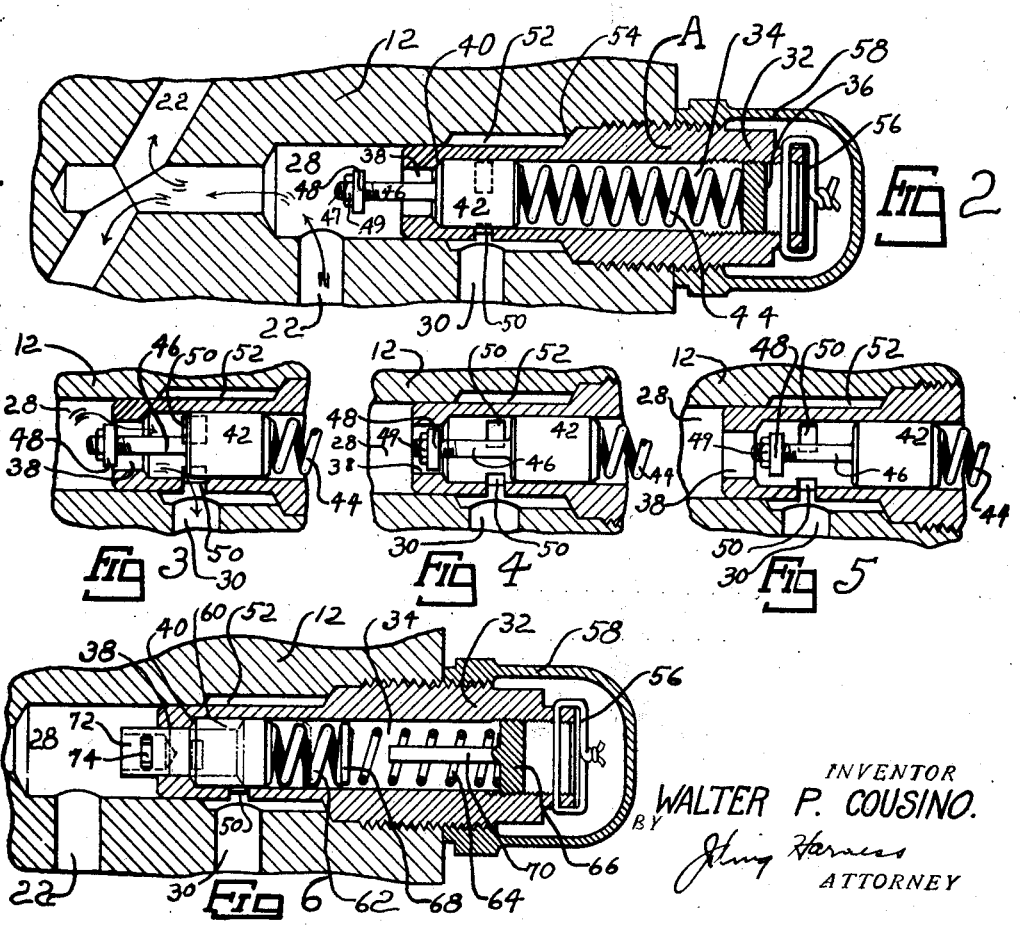
INVENTOR
WALTER P. COUSINO.
BY
ATTORNEY Patented May 14, 1929.

1,713,115

UNITED STATES PATENT OFFICE.

WALTER P. COUSINO, OF DETROIT, MICHIGAN, ASSIGNOR TO CHRYSLER CORPORATION, OF HIGHLAND PARK, MICHIGAN, A CORPORATION OF DELAWARE.

VALVE.

Application filed July 28, 1927. Serial No. 209,035.

This invention relates to a relief valve mechanism and more particularly to an oil pressure relief valve mechanism for the lubricating system of an internal combustion engine.

In the usual lubricating system of an internal combustion engine, an oil pump drains the oil from the crankcase and forces it thru passages to the bearings or such parts to be lubricated. The pressure of the oil in the passages and on the bearings is in proportion to the speed of the engine and at high engine speeds the pressure is too great for satisfactory oil economy. Heretofore a relief valve has been provided in the system such that as the oil pressure builds up to a predetermined pressure the valve opens maintaining the pressure constant for the higher speeds. This is satisfactory for certain speeds but for extreme or unusually high speeds it has been found that the conventional constant pressure is not enough to properly lubricate the bearings.

It is therefore an important object of this invention to provide a double relief valve which will maintain a predetermined constant pressure at a given range of speed and a greater constant pressure at a greater speed.

Another object of the invention is to provide a simple and inexpensive mechanism which may be readily applied to a pressure system for relieving the pressure at different stages.

A further object of the invention is to provide a device which will permit a sudden change in pressure from the lower constant pressure to the higher constant pressure.

These and other objects of the invention will more fully appear from the following description taken in connection with the accompanying drawings, in which:

Fig. 1 is a sectional view of an internal combustion engine showing an adaptation of my device.

Fig. 2 is a sectional view of the mechanism assembled in a portion of the cylinder block provided with oil passages.

Figs. 3, 4 and 5 are fragmentary views of the mechanism, showing various operating positions of the reciprocating plunger.

Fig. 6 is a modification of the invention shown in section.

Referring to the drawings, wherein I have illustrated a preferred form of my invention, an engine 10, having a cylinder block 12 and an oil pan 14 is provided with an oil pump 16 driven thru a shaft 18 by the cam shaft 20. Passages 22 have been shown in the cylinder block 12 thru which a lubricating oil is delivered to the bearings of a crankshaft 24 or other parts to be lubricated. A connection 26 leading from the pump 16 is in communication with the passages 22. The oil pump draws the oil from the oil pan and forces it thru the connection 26 and passages 22 to the bearings or such parts as are to be lubricated.

An opening 28 is formed in the side of the cylinder block 12 adapted to receive the valve mechanism A. A passage 30 forms a communication between the openings 28, which is in communication with the passages 22, and the oil pan. Thru this passage 30 excess oil is conducted back to the oil pan when the valve mechanism has relieved the pressure.

Referring particularly to Fig. 2, a body portion 32 is screw-threaded into the opening 28 and is provided with a central bore 34. The outer end of the bore 34 is provided with screwthreads to receive a plug 36 and the inner end is provided with a smaller opening 38 and a tapered seat 40. Mounted for reciprocation within the bore 34 is a plunger 42 which has a sliding fit therein and a compression spring 44, between the plunger 42 and plug 36, urges the inner end of the plunger 42 against the tapered seat 40; the inner end of the plunger being correspondingly tapered to fit the tapered seat. A projection 46 is carried by the inner end of the plunger adapted to extend thru the opening 38 and at its extreme end is a head portion 48. The head portion 48 is slightly smaller than the diameter of the opening 38 so that when the head portion 48 is in the opening 38, as will be hereinafter more fully described, oil may pass therebetween.

Openings 50 are provided in the body portion 32 to form a passage between the bore 34 and passage 30, these, however, are normally closed by the plunger 42. The bore 28 has an enlarged diameter providing a space 52 which is sealed at the one end by the inner end of the body portion tightly fitting the periphery of the bore 28 and at the other end by a tapered portion 54 on the body portion 32.

The plug 36 may be adjusted to give the desired compression on the spring 44 and when positioned it is securely held by a wire 56 or a pin extending thru openings in the body portion and a slot in the plug. A cap such as shown at 58 may be screwthreaded on the body portion 32 to form a covering for the unit.

It will be understood that the entire mechanism is a self-contained unit which is readily applied to the engine and that each part of the unit may be easily removed or replaced.

In the operation of the device, attention is directed to Figs. 3, 4 and 5 which show the different positions of the plunger while the pressures are changing; Fig. 2 being illustrative of the device when no pressure is applied to the lubricating system. When the pressure in the lubricating system begins to build up as the engine speed increases the plunger 42 and head portion are moved outwardly compressing the spring 44 until the openings 50 are slightly opened, as shown in Fig. 3. This position permits an escape of some of the oil relieving the pressure. As the pressure builds up the openings 50 are opened more by moving the plunger further outwardly thus proportionately relieving the pressure from the supplying and maintaining a constant pressure in the system. The pressure is maintained constant for the usual speed range but as the pressure continues to build up the head portion 48 approaches the opening 38 restricting the flow of oil therethru and the oil then not only applies pressure to the exposed area of the plunger but also on the area of the head portion because the oil can no longer freely pass by it thru the opening 38. This position is illustrated in Fig. 4 but it is to be understood that the plunger does not remain in this position but immediately assumes the position shown in Fig. 5 which position permits the oil to freely flow thru the opening 38 and out the openings 50 and passage 30 to the oil pan thus relieving the system at a higher predetermined pressure. This pressure remains constant due to the spring urging the head portion 48 toward the opening 38 tending to restrict its passage depending on the supply pressure.

The head portion 48 has been shown adjustable. The projection 46 is screwthreaded as at 47 to receive the head portion 48 and a nut 49 locks it in adjusted position. By moving the head portion axially on the projection 46 the higher pressure period may be controlled causing it to come into operation at any desired engine speed.

When the lubricant is cold it is more viscous and the clearance between the outer diameter of the head portion 48 and the inner periphery of the opening 38 is of proper size to permit the proper amount of lubricant to pass thru but as the lubricant heats up it becomes less viscous and more lubricant passes thru the opening reducing the pressure in the passage 22. Therefore the head portion 48 has been made of a metal having a high coefficient of expansion to permit varying the size of the passage thru the opening 38. As the head portion is heated by the lubricant it expands restricting the passage in proportion to the temperature of the lubricant thus maintaining a constant pressure for hot and cold lubricants. It will be understood that any metal such as aluminum, brass, copper, zinc or tin having a higher coefficient of expansion than the metal forming the periphery of the opening may be used.

As an illustration of a modification of my device, I have shown in Fig. 6 a plunger mounted for reciprocation within the bore 34 of the body portion 32. Two springs 62 and 64 are compressed between the plunger 60 and a plug 66. A disc 68 is carried between the two springs. The one spring 62 is stronger than the spring 64 so that the spring 64 may be compressed for maintaining the lower constant pressure. A projection or stop 70 is carried by the plug 66 adapted to engage the disc 68 when the spring 64 is compressed bringing into action the compression of the spring 62. The inner end of the plunger 60 is provided with a tubular projection 72 having openings 74 in its wall thru which oil may pass when the plunger 60 has assumed a position shown dotted. In this position the openings 74 and 50 are uncovered in proportion to the pressure on the plunger relieving it and maintaining a constant low pressure until the spring 62 comes into operation, then the pressure is built up to a predetermined point and maintained constantly at that point by the tubular projection 72 opening proportionately the opening 38; it being entirely withdrawn from the opening 38 permitting oil to pass therethru dependent on the size of the opening determined by the pressure from the supply line.

The drawings and description have been confined to a device intended for use in connection with the lubricating system of an internal combustion engine, but it is to be understood that such a device is applicable to other systems wherein a constant low pressure is desired for a given range of varying pressure and a higher constant pressure for a supply pressure above that range. Various changes may be made in the size, shape and arrangement of parts without departing from the spirit of my invention and it is not my intention to limit its scope other than by the terms of the appended claims.

What I claim is:

1. A device of the class described comprising, a body portion adapted to be received in a passage of a lubricating system, a plunger reciprocally mounted in said body portion adapted for opening and closing a pair of apertures thru said body portion by the pressure in said system, resilient means for normally holding said plunger in a position for closing said openings, and means on said plunger for partially closing one of said openings whereby a greater pressure is applied to said plunger and system.

2. A device of the class described comprising, a body portion having a cylindrical bore and an opening at its inner end extending thru said body portion, a plunger reciprocally mounted in said bore adapted for opening and closing radial openings thru said body portion, resilient means for normally holding said plunger in a position for closing said end opening and said radial openings, a projection on said plunger extending thru said end opening, and an enlarged portion on said projection adapted for partially restricting the end opening when said plunger is in a position for partially closing said radial openings.

3. A valve of the class described comprising, a body portion having a central bore, and a reduced opening at one end thereof, a plunger reciprocally mounted in said bore adapted for opening and closing openings in the wall of said body portion, resilient means for urging said plunger in a position for closing said openings, and a restriction adapted to move into the opening at the end of said body portion by a traverse of the plunger, and adapted to be removed therefrom when the openings in the wall are opened by a further traverse of the plunger.

4. A valve of the class described comprising, a body portion having a central bore and inlet and outlet openings communicating with said bore, means for normally closing said openings, and means for restricting the inlet opening when the closing means has been opened and for further opening said inlet opening upon further opening of said closing means.

5. A valve of the class described comprising, a body portion having a central bore provided with an inlet and an outlet opening, means for opening and closing said outlet opening, and a member for restricting said inlet opening when said outlet opening is partially closed and for varyingly opening said inlet opening when said outlet opening is open.

6. A valve of the class described comprising, a body portion having a central bore provided with inlet and outlet openings, means for controlling the amount of flow thru said openings to maintain a constant pressure for a given range, and means for controlling a higher constant pressure beyond the given range.

7. A valve of the class described comprising, a body portion having a central bore provided with inlet and outlet openings, a plunger within said bore for opening or closing said openings, resilient means for normally holding said plunger in closed position, means for adjusting the tension on said resilient means, and means for varyingly restricting said inlet opening.

8. A valve of the class described comprising, a body portion having a central bore provided with an inlet and an outlet opening, means for varying the opening and closing of said outlet opening acting within certain limits and for varying said inlet opening beyond that limit.

9. A valve of the class described comprising, a body portion having a central bore provided with inlet and outlet openings, a plunger within said bore for opening and closing said outlet opening, resilient means for normally holding said plunger in closed position, a head portion carried by said plunger for restricting the inlet opening when the outlet opening has been partially opened, and means for adjusting the position of said head portion.

WALTER P. COUSINO.